United States Patent [19]
Cook

[11] 3,785,087
[45] Jan. 15, 1974

[54] TOMATO PLANT TYING MACHINE

[75] Inventor: Robert Lewellyn Cook, Lake Worth, Fla.

[73] Assignee: Flavor Pict, Inc., Del Ray Beach, Fla.

[22] Filed: Nov. 16, 1971

[21] Appl. No.: 199,292

[52] U.S. Cl............................ 47/1, 289/18, 56/426
[51] Int. Cl............................................. A01g 17/08
[58] Field of Search .................... 47/1; 56/405, 426; 254/64, 134.3, 134.5; 289/18

[56] References Cited
UNITED STATES PATENTS

| | | | |
|---|---|---|---|
| 759,401 | 5/1904 | Simmonds | 56/426 |
| 767,457 | 8/1904 | Webster | 56/426 |
| 1,553,706 | 9/1925 | Meink | 56/405 |
| 2,753,661 | 7/1956 | Wiemers | 47/1 |
| 3,019,187 | 1/1962 | Grether | 47/1 |
| 3,034,259 | 5/1962 | Herr | 47/1 |
| 3,201,085 | 8/1965 | Maley | 254/64 |

FOREIGN PATENTS OR APPLICATIONS

| | | | |
|---|---|---|---|
| 202,639 | 9/1967 | U.S.S.R. | 289/18 |
| 206,938 | 12/1967 | U.S.S.R. | 289/18 |

*Primary Examiner*—Robert E. Bagwill
*Attorney*—James A. Drobile et al.

[57] ABSTRACT

A machine for supporting tomato plants and like plants between lengths of twine tied to vertical stakes, to support the tomato plants during their period of growth, facilitating harvesting and increasing the plant yield. The machine utilizes a stationary needle member and a rotating needle member to feed two lengths of twine, with the strings being tied at each stake, as the machine passes a stake. The machine includes a tensioning mechanism associated with the feed roll of twine for each of the two needles, to maintain a uniform tension on the string as it unwinds from the roll, a rotating brush to brush plants out of the path of movement of the rotating needle, and means responsive to the position of a stake to initiate the tying cycle.

11 Claims, 7 Drawing Figures

TOMATO PLANT TYING MACHINE

BACKGROUND OF THE INVENTION

This invention relates to a machine for automatically tying a pair of lengths of twine about stakes aligned in rows on a tomato farm. The tomato plants are located between the stakes. As the tomato plants grow, the stakes are used to support lengths of twine which contain the tomato plants near their tops, in order to support the vertical growth of the tomato plant. Maintenance of the vertical growth of the tomato plant is important in order to assure that the tomato plants grow to their fullest possible height and bear the maximum amount of fruit of the largest possible size, thereby increasing the harvest per plant. Also, the support and the uniform vertical growth of each plant greatly facilitate subsequent machine or manual harvesting of the plant, in comparison to the difficulties attendant to harvesting tomatoes from vines which are bent over from the weight of the fruit.

It is therefore desirable, in the farming of tomatoes, to develop a machine which will mechanically tie twine about stakes to support tomato plants as they grow. Because of the necessity for supporting each plant at three or four heights during its period of growth, and the slowness and expense of manual labor, a machine which can perform the task of stake tying efficiently and effectively, and at reasonable cost, is much more economical and desirable than the use of manual labor.

STATE OF THE ART

Machines for stringing and tying twine and wire have been known in the general agricultural arts. For example, in the growth of string beans, trellises of wire and/or twine are formed to allow the vertical growth of the string bean vine. Also, in the harvesting of sugar cane, vertical bundles of sugar cane are tied, in order to facilitate the transportation of the harvested sugar cane in bundles. However, the mechanisms of the machines used to tie string bean trellises or sugar cane bundles are not adaptable to the tying of tomato plants as they grow, because of the need, in tying tomato plants, to effect a tie of two lengths of twine about every stake, without doing any damage to the plants.

It has been suggested, prior to the instant invention, to design a tomato plant tying machine utilizing two rotating needles to feed twine, tie the twine at each stake, and support between the lengths of twine the tomato plants located between each pair of stakes. However, the suggested machine using two moving needles has been unsatisfactory for several reasons. The primary reason for the unsatisfactory nature of the prior machine is the extent of tomato plant damage done by two moving needles. Obviously, in order for a tomato tying machine to be economical, it is important that the tomato plants being tied not be excessively damaged. This damage occurs in the two-moving-needle machine when the first needle, which brushes the tomato plant out of the way, moves it into the path of the second needle, thereby causing damage to the plant. This damage is particularly significant with respect to tomato crops which are "suckered." A tomato crop is "suckered" by removing all of the extra shoots ("suckers") which grow from the main stems of the plant, leaving only the two main stems of the plant to grow fruit. By removing the "suckers," the "suckers" are prevented from taking nutrients which would otherwise be available for the optimum growth of the main stem of the plant and the fruit that it bears. However, because farms which "sucker" their plants have fewer stems which can bear fruit, injury to a plant is very harmful if the damage occurs on any widespread basis. Also, a two-rotating-needle machine uses extra string (about four inches per tie) when compared with the machine of this invention, which has one rotating needle and one stationary needle. The instant invention includes a twine tensioning mechanism which assures proper feed of the twine, thereby to minimize snarling, tangling and breakage of the twine which would otherwise occur, interfering with the efficient operation of the machine, since each time a snarl, tangle or break occurs, the operator would have to get down from the driver's seat, stop the machine, and unsnarl the twine.

SUMMARY OF THE INVENTION

This invention relates to a machine for supporting growing tomato plants by containing each plant between a pair of lengths of twine, which lengths of twine are tied to spaced stakes. The machine includes a stationary needle for dispensing twine from a first feed roll, and a rotating needle for dispensing twine from a second feed roll and for looping the twine around each stake, to encircle the length of twine from the first feed roll and fix both lengths of twine to the stake, thereby providing the necessary support for the tomato plant located between each pair of stakes. The respective rolls of twine are mounted on the individual needle assemblies, and the roll of twine which is dispensed by the rotating needle is therefore rotatably mounted on that needle unit, a feature which minimizes the likelihood of twine tangling. Each rotating needle is slightly inwardly inclined, to keep the upper portion of the needle away from the stakes, to minimize needle collision with leaning stakes.

The length of each needle is adjustable, and needles of different lengths can also be used with the machine of this invention, so that a machine can make three or more passes along any given row of tomato plants, to tie the tomato plants between the lengths of twine at different elevations proximate to the upper ends of the plants as the tomato plants grow.

Each rotating needle is preferably accompanied by a rotating brush member, mounted for travel therewith, and moving in advance of the path of travel of the needle, for the purpose of gently brushing the tomato plants out of the path of travel of the rotating needle, thereby further to minimize the likelihood of damage to any tomato plants by the rotating needle.

Each of the twine feed units, mounted on a needle unit, contains a twine tensioning mechanism, for the purpose of maintaining a substantially constant tension on the twine, as the twine unrolls from its spool. By maintaining this constant tension, breakage of twine is avoided.

The instant invention has an advantage that, if a tie about a stake is missed, the twine lengths are at least crossed, to provide additional support for the tomato plants.

It is notable that, in the operation of a tying machine of the instant type, it is important not to tie tomato plants to the stake, because the tension of the twine, when tightened about the stake, could cut the plants and ruin them. The machine of this invention effectively avoids that problem in its operation.

The machine of the invention is provided with microswitch sensors, to sense each stake, actuating an electric clutch-brake mechanism for the purpose of engaging the rotating needle drive train, so that the initiation of the cycle of rotation of the rotating needle is coordinated to the position of the machine with respect to each stake.

The mechanism of the instant invention is mounted on a conventional, commercially available spray rig, which is normally otherwise utilized for spraying insecticides and similar materials along rows of tomato plants or similar crops, and such commercially available rigs are reasonably readily adaptable for the use with the apparatus of this invention. For efficiency, in a preferred form of this invention, two plant tying units are mounted on the rig, so that two rows of tomato plants can be tied at one time by the machine of this invention.

OBJECTS OF THE INVENTION

It is therefore an object of this invention to provide a tomato plant tying machine, which will tie a pair of lengths of twine about each of a series of aligned stakes and firmly support one or more tomato plants between the two lengths of twine in the space between each pair of stakes, which machine will accomplish the result efficiently and effectively without substantial damage to the tomato plants.

Another object of this invention is to provide a tomato plant tying mechanism which uses at least one pair of needles, consisting of a stationary needle and a rotating needle.

A further object of this invention is to provide a tomato plant tying machine having a stationary needle, and a rotating needle with a brush mechanism operatively associated therewith, gently to move tomato plants from the path of movement of the rotating needle to minimize the likelihood of needle damage to the plants.

A concomitant object of this invention is to provide a tomato plant tying machine having at least one pair of needles, one of which is rotating and one of which is stationary, with a spool of twine mounted on each needle and including a twine tensioning device to maintain a constant tension on the twine, thereby to avoid twine breakage.

DETAILED DESCRIPTION OF THE PREFERRED EMBODIMENT OF THE INVENTION

Figures 2, 3:
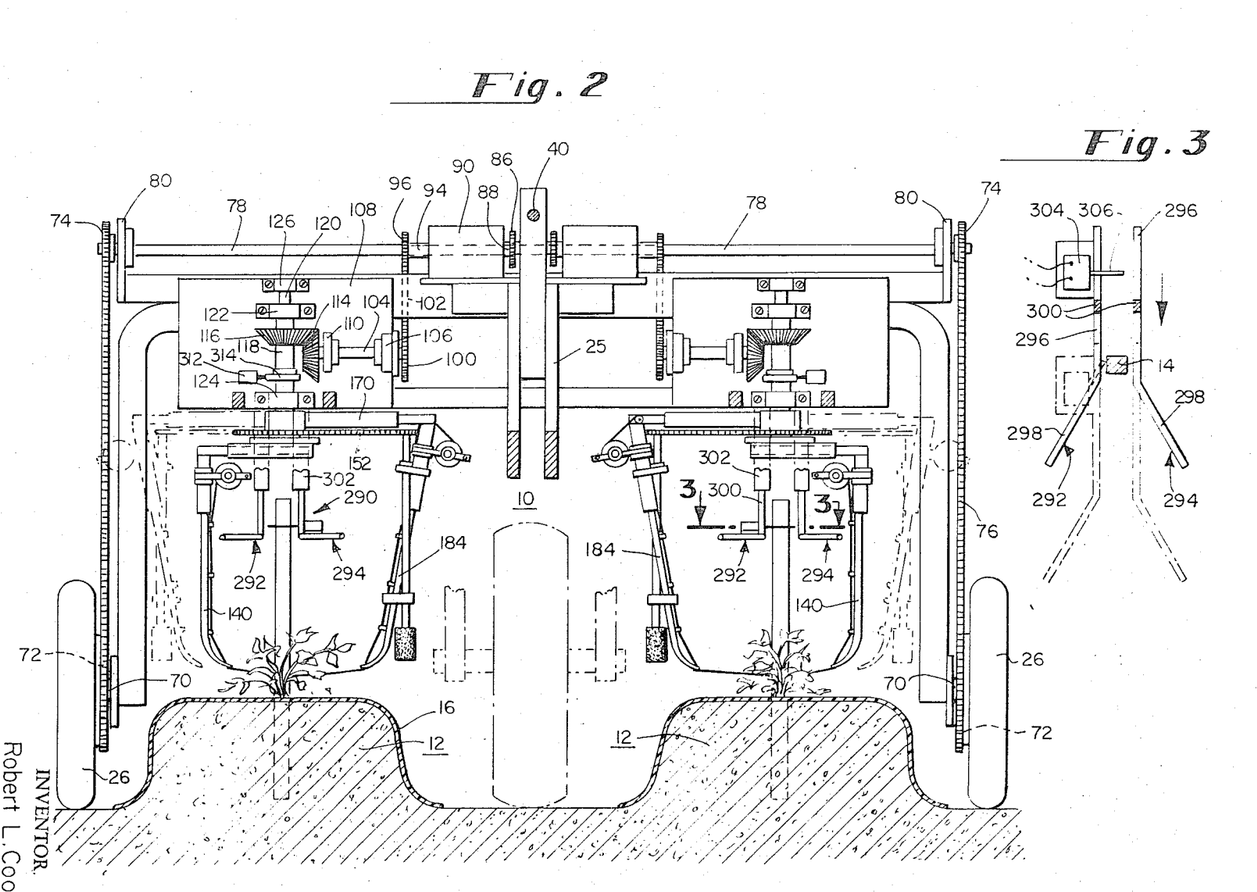
FIG. 2 is a cross-sectional view of the tomato plant tying machine of this invention, taken along line 2—2 of FIG. 1.
FIG. 3 is a cross-sectional view, taken along line 3—3 of FIG. 2, showing the stake guide means and microswitch sensor.

The invention relates to a tomato plant tying machine, generally designated 10, which travels along a pair of rows 12 of tomato plants. As best seen in FIG. 2, each row of plants comprises a mound of earth, covered by a plastic sheet 16. Located at spaced intervals along each mound are vertical stakes 14, each of which extends about 3½ feet above the ground. The stakes are spaced 36 inches apart — although the stakes can be as close as 18 inches apart with the machine of this invention — and two tomato plants are typically located in the mound between each pair of stakes.

THE FRAME

Figure 1:
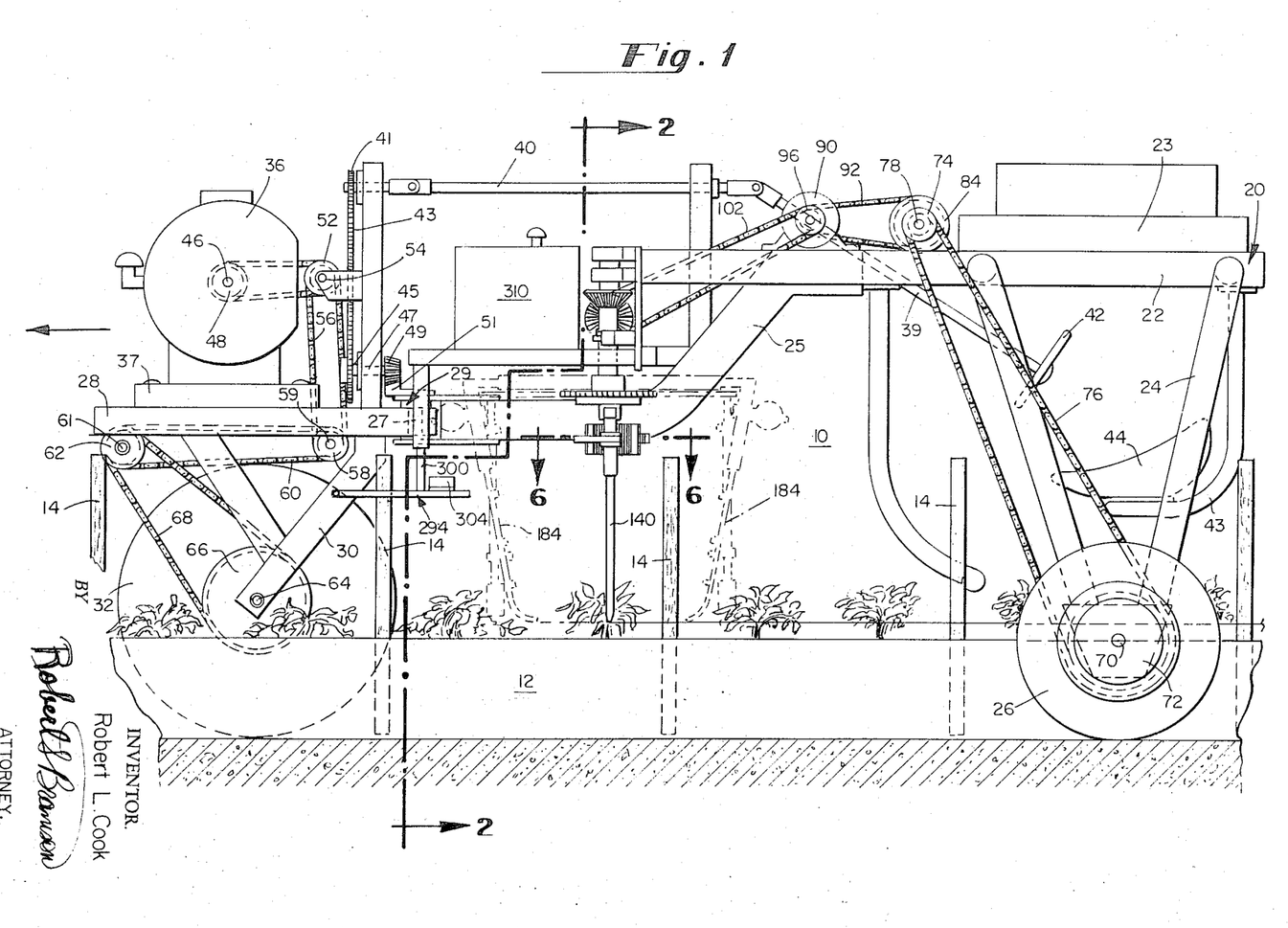
FIG. 1 is a side elevational view of the tomato plant tying machine of this invention, in position to tie two rows of tomato plants.

The frame which is used for the tomato plant tying machine of the invention is a conventional three-wheeled spray rig frame, and is seen in FIG. 1 to comprise a frame element 20 having tubular members 22 forming a rear platform section supporting a tubular leg assembly 24 on either end thereof. Each leg assembly 24 rotatably mounts a large rear wheel 26 on a rotating shaft 70. Frame member 20 has an intermediate tubular section 25 the front end of which is connected to a tubular platform section 28, rotatably mounted at journal 29 on shaft 27. Depending from section 28 is a tubular wheel mounting assembly 30, which rotatably supports the front wheel 32 on shaft 64. Engine 36 is fixedly bolted to base 37 on the front section 28, and provides the motive power supply for the tomato plant tying machine and indirectly supplies the operative power for the actual tying needles and brushes. Engine 36 is an 18 h.p. gas-powered internal combustion engine.

Steering of the vehicle is achieved by the driver, seated in driver's seat 44, which is dependently mounted by post 43 from rear platform section 22. The driver steers the steering wheel 42, which operates steering linkage mechanism 39, 40 for the purpose of rotating sprocket 41 to drive chain 43, thereby to rotate sprocket 45. Sprocket 45 is mounted on shaft 47 with bevel gear 49, and bevel gear 49 mates with sectioned bevel gear 51 to rotate the shaft 27, which is rigidly connected to front wheel platform 28, thereby steering the front wheel 32 of the unit.

Output shaft 46 of engine 36 drives sprocket 48 which is rigidly mounted thereon, and sprocket 48 drives chain belt 50, the other end of which is mounted on a sprocket (not shown) which is suitably journaled on shaft 54. Sprocket 52, also mounted on shaft 54, drives sprocket 58 by means of chain member 56. Sprocket 58 is mounted on shaft 59. Shaft 59 is supported below platform section 28. Sprocket 58 in turn drives a coaxial sprocket (not shown), which drives another sprocket (not shown) mounted on shaft 61 and driven by means of chain 60. Sprocket 62, also mounted on shaft 61, drives large sprocket 66 which is rigidly mounted on shaft 64 on which wheel 32 is mounted for rotation, by means of drive chain 68.

Mounted on the rear of the machine, to tubular frame section 22, is a suitable storage shelf 23, the purpose of which is to store balls of twine, and such other materials and equipment as may be necessary or desirable for the operation of the machine.

The foregoing structure, constituting the frame and basic motive power means for the tomato plant tying machine of this invention, constitutes a conventional, commercially available unit for a spray rig for spraying tomato plants and other similar plants. A typical such unit is commercially available from the John Blue Company.

The following discussion will only relate to the drive train and needle mechanism on one side of the machine of this invention. However, it will be appreciated that each side of the machine contains identical elements of drive train and needle mechanisms in allochiral relation. The same numerals will be used to designate like parts on both sides of the machine.

THE DRIVE TRAIN

Each of the two shafts 70, on which rear wheels 26 are mounted, also rigidly mounts a large sprocket member 72. A second sprocket member 74 is rotatably mounted on either side of platform section 22, on a shaft 78 which is rotatably mounted in suitable journals, and sprocket 74 is driven by chain 76 which engages sprockets 72 and 74.

As best seen in FIG. 2, sprocket 72, mounted on the shaft 70 which supports the wheel 26, drives the chain 76 which in turn drives the sprocket 74 that is rigidly mounted on a shaft 78. Each shaft 78 is rotatably mounted at one end in bushings 80 and at the other end in bushings in support member 82. Rigidly mounted proximate the inner end of shaft 78 is a sprocket 84 (seen in FIG. 1) which drives a sprocket 86 that is rigidly mounted on shaft 88 (seen in FIG. 2) on the input end of the electric clutch-brake unit 90. The clutch-brake unit is a commercially available unit. Sprocket 84 drives sprocket 86 through chain 92.

Rigidly mounted on the output shaft 94 of electric clutch-brake mechanism 90 is a sprocket 96, which drives another sprocket 100 through the chain 102. Sprocket 100 is rigidly mounted on drive shaft 104, which is rotatably mounted at one end in suitable journal 106 secured to the mounting plate 108 which is vertically secured to tubular member 25. The shaft 104 is rotatably mounted proximate its other end in journal 110, also fastened to vertical plate 108. The opposite end of shaft 104 rigidly mounts a bevel gear 114, which rotates in a vertical plane. Bevel gear 114 drivingly engages horizontally rotating bevel gear 116. The bevel gear 116 is rigidly mounted on hollow shaft 118, and the shaft 118 is journaled for rotation in suitable bushings 122 and 124, which are rigidly fastened to the plate 108.

THE NEEDLE UNITS

Shaft 118 is hollow, and is mounted for rotation about the inner shaft 120. The inner shaft 120 is fixedly mounted at its upper end to mounting block 126, which is rigidly mounted on mounting plate 108. Viewing FIG. 4, mounted at the lower end of stationary shaft 120 is a hub 130 which rigidly supports the stationary needle arm assembly 132. Fixedly mounted to the hub 130 is a hollow arm 134, of square cross-section, which slidably, adjustably receives the horizontally extending needle support arm 136. Needle support arm 136 is of square cross-section and is telescopingly mounted in hollow arm 134, in adjustable manner, so as to allow regulation of the position of the stationary needle 140 with respect to the axis of rotation of shaft 118. Set screw 135 in hollow arm 134 rigidly, adjustably secures needle support arm 136 in position. In the telescoped position shown in FIG. 4, the horizontal distance from the axis of the shaft 120 to the outer surface of supporting member 136 is 10.75 inches. The adjustability of arm 136 permits simple adjustment of the needle assembly to accommodate accidental bending of the needle.

Figure 4:
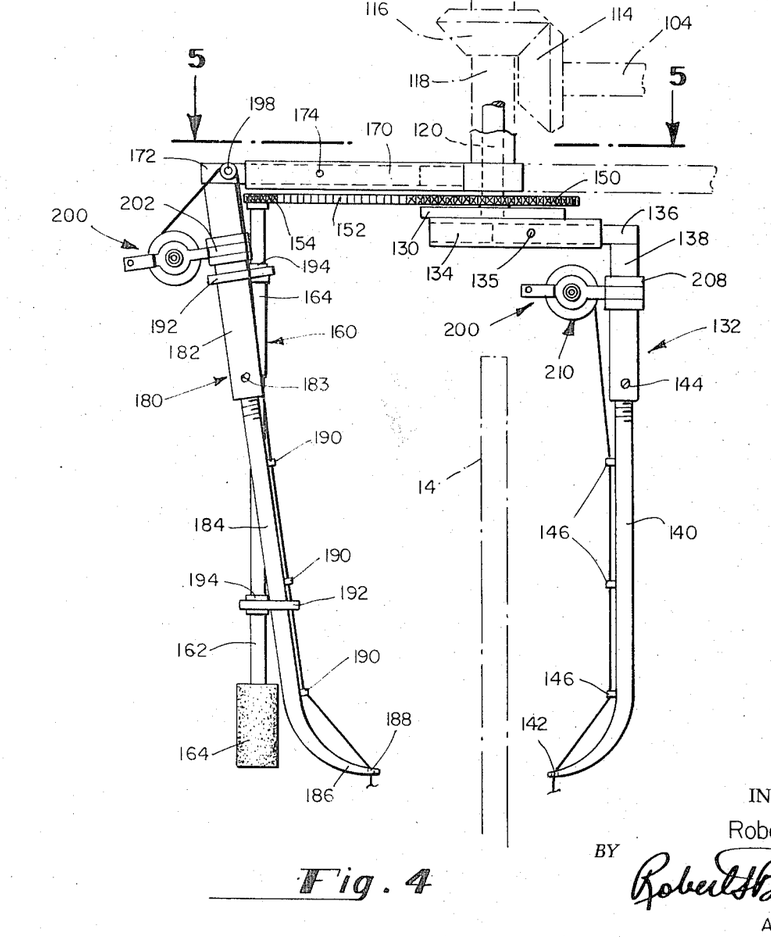
FIG. 4 is a front elevational view of the right-hand needle assembly of the tomato plant tying machine of FIG. 2.

Depending from needle support arm 136 is a hollow sleeve member 138 which telescopingly receives needle 140, which is adjustably mounted for movement therein, and is retained in fixed position in sleeve 138 by means of a suitable set screw or the like 144. Needle 140 is slidably and removably mounted in the sleeve 138 so that a second, shorter needle 140 may be substituted therefor, for the purpose of making the third and fourth ties in the growing cycle, when the tomato plant is nearing its maximum height. Sleeve 138 has a length of approximately 12 inches, and needle 140 has a free length of approximately 41 inches from the point of the needle to the lower end of sleeve 138. In the second, elevated position of the 41 inch needle shown, when used for the second tie, the free length of needle 140, extending below the lower end of sleeve 138, would be 33 inches, and the other eight inches of needle would be telescoped in sleeve 138. Needle 140 has a curved, tapered, inwardly extending lower end, containing an eye 142 to guide the passage of tying twine therethrough. The needle also has three guide eyes 146 spaced along its length on the inner surface thereof, to act as guides for the twine. The material from which needle 140 is made is preferably cold rolled steel.

Mounted on the sleeve member 138 is a twine dispensing unit 200, which will be more fully discussed hereinafter.

Rigidly mounted to the lower end of rotating shaft 118 is horizontally extending arm 170, which has a hollow core of square cross-section, and slidably, adjustably receives needle support arm 172 which is fixed in position in support arm 170 by set screw member 174. Depending from support arm 172, at an angle of 87° in a clockwise direction from arm 172 as seen in FIG. 4 (the angle is exaggerated in the drawings, for illustrative purposes) is the rotating needle unit 180. Needle unit 180 has a hollow sleeve member 182, which is rigidly mounted at its upper end to needle support arm 172 and depends therefrom. Telescopingly, adjustably mounted in the sleeve member 182, by means of set screw 183, is needle 184. Needle 184 is straight, having a curved, tapered, inwardly extending lower end 186 terminating in an eye 188 proximate its end, through which the tying twine is guided. A plurality of additional twine guide members 190 are mounted along the length of the needle member. As seen in FIG. 4, with the adjustable arm 172 in its innermost position, the horizontal distance from the axis of shaft 118 to the axis of the needle assembly 180 is about 14 inches. The length of sleeve 182 is 15 inches. The distance from the end of needle 184 (shown in its extended position for the first tie) to the lower end of sleeve 182 is about 41 inches, and the horizontal distance (in the first tie position shown in FIG. 4) between the leading edges of needle 184 and needle 140 (which are coplanar) is about 20 inches. The material of the needle 184 is preferably cold rolled steel.

BRUSH UNIT

Brush member 160 is supported on needle member 180 by means of a pair of support brackets 192, each of which is fixedly mounted to the needle assembly, one being mounted on sleeve member 182, and the other being mounted on needle 184. Each of the two support brackets contains a bushing 194 in which the brush member is rotatably, supportedly mounted.

Brush member 160 comprises a straight hollow upper sleeve 164 having its upper end rigidly fastened, as by welding, to sprocket 154. Adjustably, telescopingly mounted in upper sleeve 164 is shaft member 162. At the lower end of shaft 162, a cylindrical brush member 164 is fixedly attached, as by the use of a suitable adhesive. Brush member 164 is formed of a soft, resilient material, such as flexible polyurethane foam, and rotates with brush assembly for the purpose of gently brushing tomato plants out of the way of the path of movement of needle member 184, to minimize injury to the tomato plants by the motion of the needle member.

Rigidly mounted on non-rotatable shaft 120, above support arm 134 for the stationary needle unit, is sprocket 150. Chain 152 passes around sprocket 150 and around sprocket 154. Sprocket 154 is rigidly fastened to the upper end of sleeve 164 of brush member 160, which depends vertically therefrom.

Figure 5:
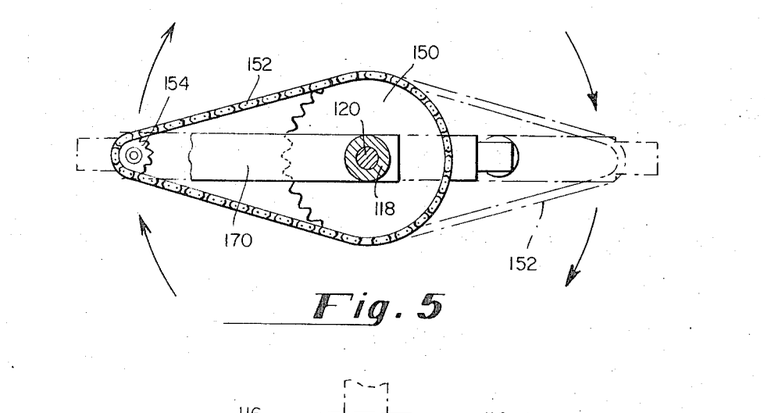
FIG. 5 is a top plan view, partly in cross-section, taken along line 5—5 of FIG. 4.

As the rotating needle assembly 180 rotates, in a manner to be described more fully hereinafter, brush unit 160 moves therewith, and is rotated by the rotation of sprocket 154 as it rotates with respect to the fixed sprocket 150, by the action of chain 152, as best seen in FIG. 5. Thus, so long as needle assembly 180 is rotating, brush 164 is rotating therewith, leading the path of travel of the needle member 184, thereby gently to brush plants out of the path of travel of the needle member 184 to minimize damage to tomato plants therefrom. The speed of rotation of brush 160 is preferably about eight times the speed of rotation of needle assembly 180.

TWINE DISPENSING UNITS

Each twine dispensing assembly 200 is mounted on a sleeve member 138 or 182 (depending on whether it is mounted on a stationary or rotating needle assembly) by means of mounting bracket 202. A guide roll 198 is mounted on needle support arm 172, to guide the feed of twine from the twine dispensing assembly 200 along the length of needle 184.

Figure 6:
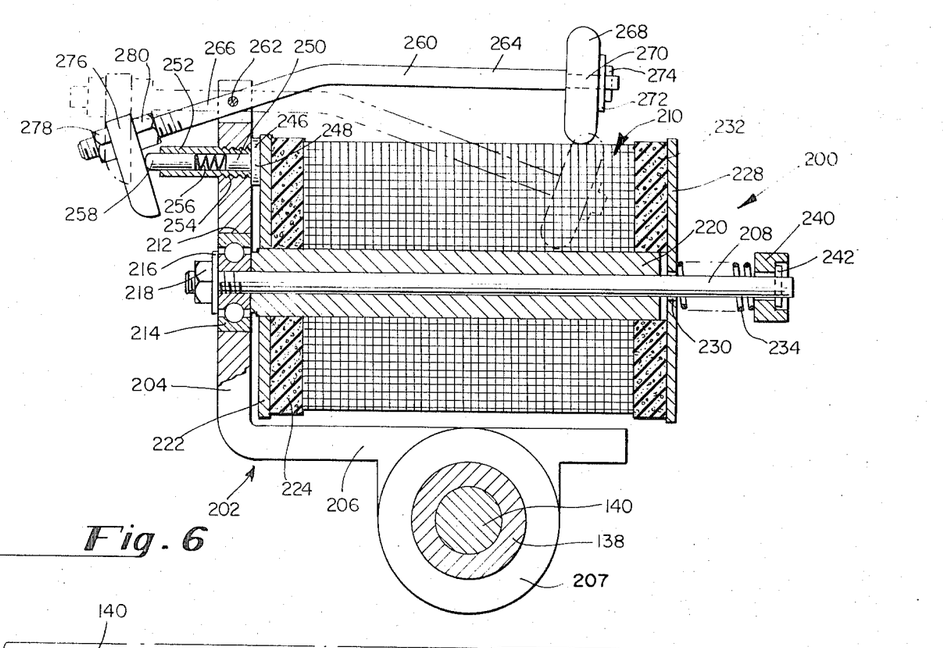
FIG. 6 is a front elevational view, partly in cross-section, of the twine feed mechanism of this invention, taken along line 6—6 of FIG. 1.

FIG. 6 shows the details of the twine feeding device 200. Each twine feeding device comprises a mounting bracket 202 having a twine roll support arm portion 204 and a transverse arm portion 206 which terminates in a sleeve 207 which is rigidly mounted about the corresponding needle support sleeve 138 or 182, as the case may be. A shaft 208, made of steel, has one end rotatably mounted in a suitable aperture 212 in member 204, by means of bearing assembly 214. The end of shaft 208, which extends beyond the bearings, is prevented from slipping out of the assembly by means of a suitable washer 216 and a nut 218 which is threaded on the threaded end of shaft 208.

Mounted on the steel shaft 208 is a core member 220, formed of any suitable rigid material, such as aluminum, on which member the spool of twine 210 is mounted. Slidably mounted over that core member is an end backing plate 222 formed of aluminum, for example, to which is fastened, as by adhesive, polyurethane foam liner member 224, having a thickness of about one inch. Polyurethane foam liner member 224 is formed of a flexible, polyurethane foam.

Slidably mounted at the other end of core 220 and shaft 208 is a second end backing plate 228, having an aperture 230, through which the other end of shaft 208 extends. Adhesively secured to the inner face of plate 228 is a liner 232 of polyurethane foam similar to polyurethane foam member 224. Backing plate 228 is held in place, and thereby functions to hold the spool of twine 210 in place on the shaft 208 and core 220, by means of compression spring 234 which acts, at one end, against backing plate 228, and which is held in place, at the extreme end of shaft 108, by an aluminum nut 240. Nut 240 is seated over a pin 242, which is fixedly mounted at the end of shaft 208, so that the nut lockingly engages the pin with 90° of rotation of the nut, and is advanced against spring 234 when it is thus rotated, to compress spring 234 somewhat and cause it to bear against the backing plate 228 and hold the backing plate and roll of twine in place.

Nut 240 can be unlocked and removed by 90° rotation, and spring 234 and backing plate 228 then slide off shaft 208, to permit the easy and quick placement of a new ball of twine on core member 220, when a given ball of twine has been exhausted.

When a new ball of twine has been placed on core 220, backing plate is again placed on the core member, compression spring 234 is placed over the end of shaft 208, and aluminum lock nut 240 locked in place, thereby to place the unit again in operative position for dispensing twine.

The twine dispensing assembly also includes a mechanism for maintaining a relatively constant tension on the twine as it is dispensed from ball 210, in order to minimize the likelihood of twine becoming tangled or snarled. Snarling or tangling of twine is a very undesirable condition to occur, since it requires the operator to stop the operation of the tomato plant tying machine of the invention, get off of the machine, and unsnarl or untangle the twine, before operation of the machine can resume.

The tensioning device constitutes a spring-loaded brake shoe 246, which comprises a face member 248 and a shaft section 250. The brake shoe member is preferably formed of nylon. The shaft section 250 is slidably mounted in steel sleeve 252 which is threadedly mounted in aperture 254 in bracket 202. Sleeve 252 is hollow and contains, slidably mounted therein, a compression spring 256 and a transmission pin 258.

Traveling arm 260 is rotatably mounted on end member 204 of bracket 202 by means of pin 262. Arm 260 has a first section 264, which is about 6 7/8 inches in length, and a second section 266 which is about 3 ¾ inches in length, and is bent at an angle of about 15° with respect to section 264. Mounted on reduced section neck 270 at the free end of section 264 of arm 260 is follower roll 268, which is formed of aluminum, is rotatably mounted on arm 260, and is held in place by thrust washer 272 and cotter pin 274.

The free end of section 266 of traveling arm 260 is threaded and adjustably supports a pressure bar 276 between a pair of lock nuts 278 and 280. The position of the pressure bar 276 on arm 260 can be adjusted by adjustment of lock nuts 278 and 280, thereby adjusting the extent to which pressure pin 258 compresses spring 256 when the unit is in the initial position shown in FIG. 6. In the position shown in FIG. 6, the spring 256 is under the maximum compression from pressure pin 258. Therefore, the pressure with which brake shoe 246 engages backing plate 222, providing a frictional force restraining the rotation or unwinding of the string, is the greatest in this position. As the roll of string unwinds, and traveling arm 260 and its follower 268 move from the starting position shown in FIG. 6 (where section 264 is parallel to the axis of twine roll 210) to the final position shown in phantom in FIG. 6, the pressure bar 258 moves from the extreme position of compression of spring 256 (and therefore the extreme force restricting the unrolling of twine) to the position shown in phantom in FIG. 6 where the minimum compression of spring 256 is effectuated, and therefore the minimum resistance to rotation to the spool of twine is encountered. In this way, a relatively uniform tension is maintained on the twine as it unrolls from the spool of twine, thereby to minimize the likelihood of snarling or breakage of the twine.

A twine feeding assembly 200 is located on each of the needle units, respectively designated 132 and 180, and each serves the purpose of supplying twine for that particular needle unit.

Because the twine feeding assemblies are acutally located on the needle units themselves, and particularly because twine feeding assembly 200 is located on each rotating needle unit 180, the likelihood of tangling or breakage of twine is further minimized by this feature of this invention, in contrast to the possibility of tangling or breakage which would be present were the twine feeding units to be mounted elsewhere on the machine.

SENSING UNITS

As best seen in FIGS. 1 and 2, a pair of stake guide units, designated 290, are mounted on the frame of the machine, one in association with each pair of needle units. Each guide unit 290 constitutes two separate arm members, respectively designated 292 and 294. Each arm member 292 and 294 includes an elongated channel portion 296 and a diverging end guide portion 298, best seen in FIG. 3. The guide arms are mounted to the frame by means of vertical support arms 300, which are rectangular in cross-section and are received in complementary hollow support members 302, which receive arms 300 therein, whereby the arms are locked in vertically adjustable position by means of suitable set screws (not shown).

Mounted on each of the arms 292 is a relay switch 304 having an actuating arm 306 mounted in the travel channel between parallel sections 296 of the two guide members 292 and 294. Relay switch 304 is connected to brake-clutch unit 90. When relay switch 304 is activated by a stake 14 moving activation arm 306, brake-clutch mechanism 90 is energized, the power for the brake-clutch being obtained from 12 volt battery unit 310. Mounted on backing plate 108, proximate rotating sleeve 118 is a single throw, three pole microswitch 312 which is actuated by a cam surface 314 rigidly attached to and encircling shaft 118 and engaging an actuating arm of microswitch 312 at a point in each revolution of shaft 118. When the cam 314 is in the switch engaging position with respect to switch 312 the brake of the brake-clutch mechanism 90 is energized (and the clutch disconnected) to discontinue the rotation of the rotating needle unit 180.

Although the vertical distance of guide members 292 and 294 from sleeves 302 is variable, this distance can be maintained for all of the ties which are made by the machine, with the distance being controlled to accommodate the height of the average stake in the field, which in a typical example is about 40 inches above the ground level.

OPERATION OF THIS INVENTION

In the operation of the invention, the spools of twine 210 are initially mounted on the twine feeding units 200. One spool of twine is mounted on each of the twine feeding units attached to each rotating needle and each stationary needle. Each spool of twine is mounted on the twine feed unit, by reverse rotating lock nut 240, removing the lock nut, removing spring 234 and backing plate 228 and inserting a spool of twine on core member 220. Backing plate 228 is then slid over shaft 208 and core 220, spring 234 is put back in place, and locking nut 240 is locked in place, thereby locking the roll of twine in position. When a fresh spool of twine is thus mounted on the core 220, the follower 268 of arm 260 is in the position shown in FIG. 6, and the pressure bar 276 forces pressure pin 258 to the maximum position toward the right (viewing FIG. 6), thereby effectuating the maximum compression of spring 256, and providing the maximum brake force applied by brake shoe 246 against the spool backing plate 222.

The twine from each roll is then threaded through the guide loops on each needle assembly. The twine for the rotating needle 180 is first passed over guide roll 198, and is then threaded through eyes 190 and through final eye 188. The twine for the stationary needle 132 passes directly through eyes 146 and through terminal eye 142. The free ends of the lengths of twine for each pair of rotating and stationary needles 180 and 132 are then knotted together with a suitable knot, which is necessary for the initiation of the operation of the tying operation of the machine.

In the instance of the first tie of tomato plants, which normally occurs when the plants have reached the height of about eight to ten inches, the needles 184 and 140 and brush 160 are respectively located so that the vertical distance of the needles and brush below the terminal end of the respective sleeves 182, 138 and 164 is 41 inches.

The operator then gets in the driver's seat 44, and guides the tying machine down two rows of tomato plants, steering with the use of steering wheel 42 and the attendant steering mechanism. Front wheel 32 of the tomato tying machine is driven by engine 36 acting through sprockets 48 and 52 and chain 50, sprockets 52 and 58 and chain 56, sprockets 58 and 62 and chain 60, and sprockets 62 and 66 and chain 68, to propel the machine.

When the channel members 292 and 294 reach the first stake 14, the stake is initially engaged by the divergent end portions 298 thereof and any tilted stakes are moved to a position between the narrowly spaced parallel sections 296. Therefore, if any stake is located at an angle with respect to the vertical, it is straightened by the converging channel members. Thereafter, the machine continues its progress, and when the stake is passed by the actuating arm 306 of relay 304 the clutch of clutch-brake mechanism 90 is engaged.

As the tomato plant tying machine is driven by wheel 32, wheels 26, because of their frictional engagement with the ground, rotate as well. Each rear wheel 26 is rigidly mounted on shaft 70, and each shaft 70 has rigidly mounted thereon a sprocket 72, for rotation therewith. Therefore, as each rear wheel rotates, its sprocket 72 drives sprocket 74 at the other end of chain 76. Each sprocket 74 rotates shaft 78 on which it is mounted, and each shaft 78 (at its opposite end) drives a sprocket 84 which, in turn, through chain 92, drives sprocket 86, which is mounted on the input shaft 88 of clutch-brake unit 90. When the clutch portion of the clutch-brake mechanism has been engaged by relay 304 having been actuated by stake 14, the input drive 88 produces output rotation of shaft 94, on which sprocket 96 is mounted. Sprocket 96, acting through chain 102, drives sprocket 100, which is rigidly mounted upon shaft 104. This rotation of shaft 104 rotates bevel gear 114.

Bevel gear 114 engages bevel gear 116 which is rigidly mounted on sleeve 118, and thereby rotates sleeve 118. Support arm 174, rigidly supporting rotation needle unit 180, is rigidly fastened to sleeve 118, and rotates therewith. Therefore, needle assembly 180 rotates under the motive power of the rear wheel 26, when the clutch-brake mechanism is energized by relay 304. As rotating needle 180 rotates about stake 114, twine is dispensed from a roll of twine 210. The unrolling of twine from each of the spools mounted on the rotating and stationary needle is initially accomplished when the knotted twine engages the first stake, which provides an obstacle to movement of the twine and thus provides a pulling force to unwind twine from the rolls.

As each rotating needle assembly 180 rotates, the brush unit 160, which is fixedly mounted thereto by means of mounting units 192 and which is rotatable about its vertical axis in bushings 194, rotates therewith. Each brush, as it moves in advance of its corresponding rotating needle, in the clockwise direction shown in FIG. 5, is rotated by the rotation of its sprocket 154 by chain 152 moving with respect to fixed sprocket member 150. Therefore, so long as needle unit 180 is rotating, its brush unit 160 is rotating, with soft polyurethane brush member 164 leading the travel of the rotating needle and gently but relatively rapidly rotating to move any tomato plants out of the path of movement of the rotating needle to minimize needle damage to the plants.

Figure 7:
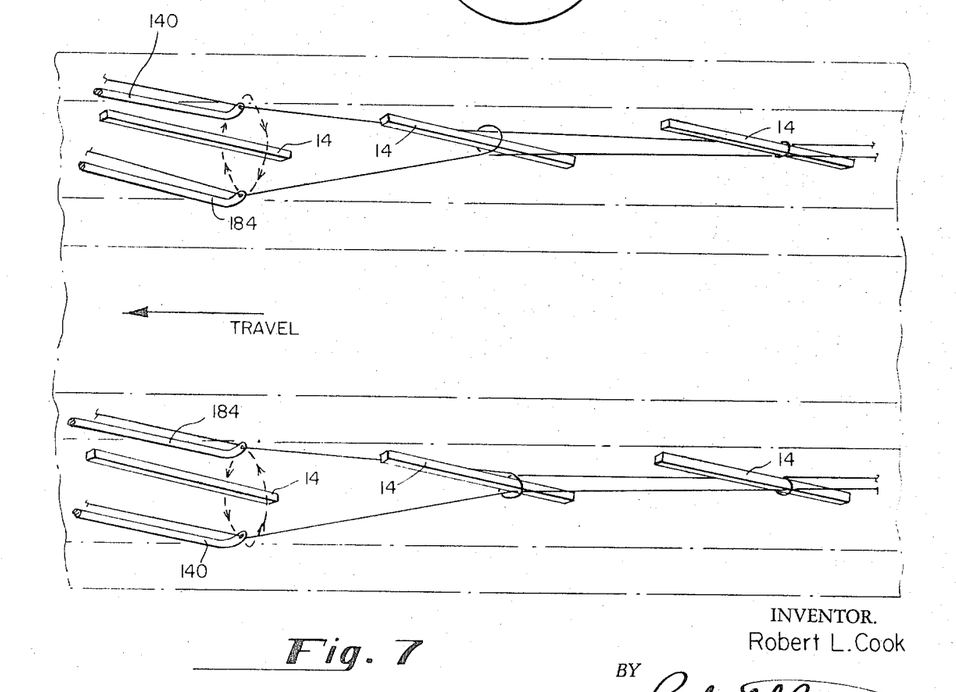
FIG. 7 is a perspective view of two rows of stakes, showing, in schematic form, the travel path of two sets of needles in wrapping twine around the stakes of each row.

As the tying machine moves, the rotating needle rotates around each stake in its travel path through the path shown in FIG. 7, drawing a loop around the stake, and catching the twine from the stationary needle within that loop as the rotating needle passes behind each stake and begins to tighten a previously formed loop. Since the lower ends of the rotating and stationary needles of each pair are at the same vertical elevation, the twine dispensed by the rotating needle will slip below the twine dispensed by the stationary needle and will engage and tighten that twine around the stick, in the manner shown in FIG. 7. Once the rotating needle has completed its circular path and discontinued its rotation, the twine is tightened as the tying machine moves with respect to any given stake, thereby providing a looped tie in the manner shown in FIG. 7.

It is important to note that the tie is formed at the stake, and that the tomato plants are preferably not tied. Rather, the tomato plants are maintained in vertical position by the restraining force of the two lengths of twine between each pair of stakes, one length of twine being located on either side of each tomato plant.

Immediately after the clutch of brake-clutch mechanism 90 is energized by switch 304, rotation of shaft 118 commences. As this rotation begins, relay 312 is energized and controls the further operation of the brake-clutch mechanism, relay 304 then promptly being de-energized. Cam 314 on shaft 318, upon commencement of rotation of the shaft, disengages the cam follower portion (not shown) of the relay 312, so that the shaft makes a 360° rotation with the follower disengaged. When that rotation has completed a complete revolution, the cam 314 reengages the follower portion of microswitch 312, deenergizing the clutch portion of clutch-brake mechanism 90 and energizing the brake portion of clutch-brake mechanism 90 thereby to stop the rotation of the rotating needle unit 180 and to discontinue the translation of rotation of clutch-brake mechanism input shaft 88 into rotation of clutch-brake mechanism output shaft 94.

In this condition, the unit is ready to continue its movement down a path of tomato plants, until the succeeding stake passes through the guide members 292 and 294, and trips actuatingly arm 306 of relay 304, to re-energize the clutch of the clutch-brake mechanism 90, and initiate rotation of shaft 118 for a second tying cycle.

As has been discussed, the individual needle members 140 and 184 are vertically moveable within their respective mounting sleeves 138 and 182 to regulate the height at which a tie is made about any given stake. Similarly, shaft 162 of the brush mechanism is mounted in sleeve 164 to permit its elevation.

For the third and (if desired) fourth ties, shorter needle and brush units would desirably be used, having respective free length vertical lengths of about 21 and 28 inches in the two operating positions.

Rotating and stationary needle support arms 172 and 136 are respectively horizontally adjustable in their respective mounting members 170 and 134. Therefore, the radius of rotation of the rotating arm can be adjusted and its relative position to respect to the stationary arm can be adjusted to accommodate differences in spacing between stakes and between plants, to avoid injury to plants. Thus, the radius of rotation of the rotating needle can be controlled, to minimize the likelihood that plants will be injured during the rotating cycle. Also, the needle 180 radius of rotation can be adjusted to account for any accidental bending of the needle. Moreover, the tension on chain 152 which drives brush 160 can easily be controlled by adjusting rotating needle support arm 172.

As has also been discussed, the rotating needle is inclined inwardly at an angle of 87° from the horizontal. The reason for this is to keep the body of the rotating needle as far away from the individual tomato plants as possible, thereby to minimize the likelihood of damage to tomato plants by the needle.

In the foregoing detailed description of this invention, there has been described the preferred embodiment of the invention. However, it will be appreciated that many changes and variations can be made from the described preferred embodiment, without departing from the spirit and scope of this invention. For example, the particular design of the rig with respect to which the invention is used can be varied considerably, the rig illustrated being chosen as being commercially available and reasonably adaptable for purposes of this invention. Also, although the instant unit is shown as being adapted for use with two rows of tomato plants, it is possible, within the scope of this invention, to adapt the machine for use with a single row of tomato plants or for use with three or four more rows of tomato plants.

Furthermore, although sprocket and chain mechanisms are illustrated for the purpose of transmitting motive power, it will be appreciated that other forms of power transmission, such as gear trains, could be utilized.

The foregoing invention has been described throughout the application as a tomato plant tying machine, and it has particular application for that purpose. However, it will be appreciated that the invention could be applied to the tying of other kinds of growing plants or vines requiring tying for support. For example, pea plants are also tied to permit their proper vertical growth, and the invention could easily be adapted for use with pea plants tied between stakes.

In the operation of the machine, the normal speed of rotation of the needle is such that the needle travels about 15 inches per rotation. In this way, about 20 or 30 stakes may be tied by the machine in each row in about one minute.

What is claimed is:

1. In an apparatus for tying tomato plants and other vines between a pair of lengths of twine which are fastened to stakes, and having a wheeled frame, the improvement comprising: a first vertically extending rotating needle, said frame including needle support means mounted thereon defining a vertical axis of rotation and rotatably, dependingly mounting said first needle for rotation about said axis, a second vertically extending stationary needle, said needle support means non-rotatingly, dependingly mounting said second needle at a closer distance to said axis than said first needle and substantially coextensive with said first needle, motive power drive means mounted on said frame, means connecting said rotating needle to said drive means whereby said rotating needle may be rotated about said axis, two twine dispensing means, one of said twine dispensing means supplying twine to said rotating needle and the other twine dispensing means dispensing twine to said stationary needle, each of said twine dispensing means being mounted on said frame, and switch means mounted on said frame in the path of said stakes and adapted to initiate rotation of said rotating needle by said drive means in response to a contact with a stake.

2. Apparatus as set forth in claim 1, wherein each of said twine dispensing means is mounted directly vertically above its corresponding needle and is directly connected thereto.

3. Apparatus as set forth in claim 1, wherein said wheeled frame includes at least one driven wheel connected to said motive power means and the motive power for said rotating needle is transmitted from said driven wheel through a power train mounted on said frame and drivingly interconnecting said driven wheel and said rotating needle and including a clutch-brake mechanism mounted in the power train, and wherein said switch means initiates engagement of the clutch of said clutch-brake mechanism to drive said rotating needle.

4. Apparatus as set forth in claim 1, including rotating brush means having a vertical axis and mounted on said rotating needle assembly in leading relationship thereto, and driving means connected to said brush means to rotate said brush means with respect to its vertical axis.

5. Apparatus as set forth in claim 4, wherein said brush means includes a resilient brush member proximate its lower end and a horizontally extending sprocket rigidly attached proximate its upper end, a second sprocket fixedly mounted on said frame and coplanar with said first sprocket, and a chain interconnecting said two sprockets, whereby said brush is rotated with respect to its vertical axis as said rotating needle is driven by said motive power means.

6. Apparatus as set forth in claim 1, including: one spool of twine mounted on each twine dispensing means, a constant tensioning device mounted in operative relation to each spool of twine and comprising a spool mounting bracket, means fastening each bracket to its corresponding needle, a shaft rotatably mounted in said bracket to rotatably support the spool of twine, a friction plate slidably mounted on said shaft to frictionally engage a side of said spool, spring means mounted on said bracket and engaging a brake member adapted to bear against said friction plate with variable force, and actuating means mounted on said bracket and operative in response to the amount of twine on said spool to vary the force upon said spring means.

7. Apparatus as set forth in claim 1, including a pair of horizontally extending guide means mounted on said frame having divergent leading ends and substantially parallel, spaced body section spaced apart an amount slightly larger than the width of a stake about which twine is to be tied, said switch means comprising relay means mounted on said guide means and having an actuating arm located in the path of movement of a stake between said body sections.

8. Apparatus as set forth in claim 1, wherein said needle support means includes a mounted on said frame, and a rotating vertically extending sleeve substantially parallel to said stationary shaft and terminating above the lower end thereof, means vertically adjustably dependingly mounted said stationary needle to the lower end of said shaft, a horizontally extending arm of adjustable length fixedly mounted to said rotating shaft to rotate therewith and fixedly and pendulously supporting the rotating needle.

9. Apparatus as set forth in claim 1, wherein said rotating needle converges inwardly at an angle of approximately 3° from the vertical, said non-rotating needle is substantially vertical, and wherein each of said stationary and rotating needles is vertically adjustable within said support means.

10. Apparatus as set forth in claim 1, including clutch-brake means interconnecting said motive power means and said rotating needle, means connecting said switch means to said clutch-brake to engage said clutch when a stake is sensed, and means mounted on said frame and connected to said brake to engage said brake upon completion of a single rotation of said rotating needle.

11. Apparatus as set forth in claim 1, including driving means mounted on said frame and wherein said frame includes at least one driven wheel mounted thereon and connected to said driving means, and wherein the motive power means constitutes a second wheel mounted on said frame and driven only by frictional contact with the ground and transmitting motive power through a power train mounted on said frame and drivingly interconnecting said second wheel and said rotating needle, a clutch-brake mechanism mounted on the power train, and said switch means operating in response to the presence of a stake in the path of said apparatus to initiate engagement of the clutch of said clutch-brake mechanism to drive said rotating needle assembly.

* * * * *